(12) United States Patent
Wang et al.

(10) Patent No.: US 7,215,841 B2
(45) Date of Patent: May 8, 2007

(54) EXTRACTING PHASE ERROR IN WAVEGUIDES

(75) Inventors: Everett X. Wang, San Jose, CA (US); Sai Yu, Gilbert, AZ (US); Yi Ding, Milpitas, CA (US); Dmitri E. Nikonov, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/019,718

(22) Filed: Dec. 21, 2004

(65) Prior Publication Data

US 2006/0133719 A1 Jun. 22, 2006

(51) Int. Cl.
*G02B 6/26* (2006.01)
(52) U.S. Cl. ...................................................... 385/15
(58) Field of Classification Search .................... 385/15
See application file for complete search history.

(56) References Cited

U.S. PATENT DOCUMENTS

| | | | |
|---|---|---|---|
| 5,719,976 A * | 2/1998 | Henry et al. ................. 385/50 |
| 6,304,687 B1 | 10/2001 | Inoue et al. |
| 6,321,000 B1 * | 11/2001 | King .............................. 385/24 |
| 6,442,314 B2 | 8/2002 | Nara et al. |
| 6,711,183 B1 * | 3/2004 | Mizuuchi et al. ............. 372/22 |
| 6,757,454 B2 | 6/2004 | Inoue et al. |
| 6,847,762 B2 * | 1/2005 | Sweetser et al. .............. 385/37 |
| 6,975,781 B2 * | 12/2005 | Takiguchi et al. ............. 385/3 |
| 2002/0015554 A1 * | 2/2002 | Oguma et al. ................ 385/24 |
| 2002/0159703 A1 * | 10/2002 | McGreer ....................... 385/43 |
| 2003/0219188 A1 * | 11/2003 | Doi et al. ........................ 385/3 |
| 2004/0005116 A1 * | 1/2004 | Sweetser et al. .............. 385/37 |
| 2005/0053332 A1 * | 3/2005 | Doerr ............................ 385/37 |
| 2005/0068539 A1 * | 3/2005 | Tobiason ..................... 356/499 |

OTHER PUBLICATIONS

Goh, T., S. Suzuki, & A.Sugita, "Estimation of Waveguide Phase Error in Silica-Based Waveguides", *Journal of Lightwave Technology*, vol. 15, No. 11, Nov. 1997, pp. 2107-2113.

* cited by examiner

*Primary Examiner*—Ellen E. Kim
(74) *Attorney, Agent, or Firm*—Rabindranath Dutta; Konrad Raynes & Victor LLP

(57) ABSTRACT

Provided are a method and a system, wherein optical beams of a plurality of wavelengths are directed through a plurality of optical devices, wherein waveguides comprising the optical devices have different fabrication errors, and wherein the waveguides have a plurality of waveguide lengths and a plurality of waveguide widths. Optical phase errors corresponding to the waveguides are measured by the optical devices. A determination is made of the components of the optical phase errors for the waveguides from the measured phase errors.

29 Claims, 6 Drawing Sheets

EXTRACTING PHASE ERROR IN WAVEGUIDES

BACKGROUND

A waveguide is a material medium that confines and guides a propagating electromagnetic wave. An optical waveguide may comprise a filament of a light conducting medium, where the light conducting medium may include silicon dioxide ($SiO_2$), silicon, compound semiconductors, etc. The filament of the light conducting medium may be referred to as a core, and the core may be surrounded by a cladding. The cross section of the optical waveguide may be circular or rectangular. The refractive index of the core is higher than that of the cladding for the light to be guided by the optical fiber.

An arrayed waveguide grating may be comprised of circuitry in which optical waveguides comprising a silica-based cladding and core are fabricated on a substrate of silicon. Crosstalk may affect the performance characteristics of an arrayed waveguide grating. Optical phase errors in the waveguides that comprise the arrayed waveguide grating may contribute to the crosstalk. The optical phase error in a waveguide, $\partial \phi$, may be caused by imperfections in the waveguide as a result of fabrication processes. The imperfections may be caused by fluctuations in waveguide parameters, such as, the spatial core size error, $\partial w$, the refractive index error of the core, $\partial n_{core}$, the refractive index error of the cladding, $\partial n_{clad}$, and the actual waveguide length error, $\partial L$.

The ability to identify and extract the optical phase errors in a waveguide may assist in debugging the design of waveguides and in improving the fabrication process of waveguides. The optical performance of arrayed waveguide gratings and other devices, such as, devices based on Mach-Zehnder interferometers, may also be improved, where the performance of the arrayed waveguide gratings and the other devices are affected by the optical phase errors of waveguides.

Details of the theory of waveguides are described in the book "Integrated Optics: Design and Modeling" by Reinhard Marz, published by Artech House, Inc., 1995. Certain techniques for extracting optical phase errors in waveguides and interferometers are described in the publication entitled "Estimation of Waveguide Phase Error in Silica-Based Wavelengths" by T. Goh, S. Suzuki, and A. Sugita, published in the Journal of Lightwave Technology, Vol. 15, No. 11, November 1997, pages 2107–2113.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Identifying and extracting the components of the optical phase error of a waveguide is useful to improve the design and the fabrication process of optical devices, such as, arrayed waveguide gratings, and Mach-Zehnder interferometers. Certain embodiments allow the extraction of the components of the optical phase error of a waveguide.

Figure 1:
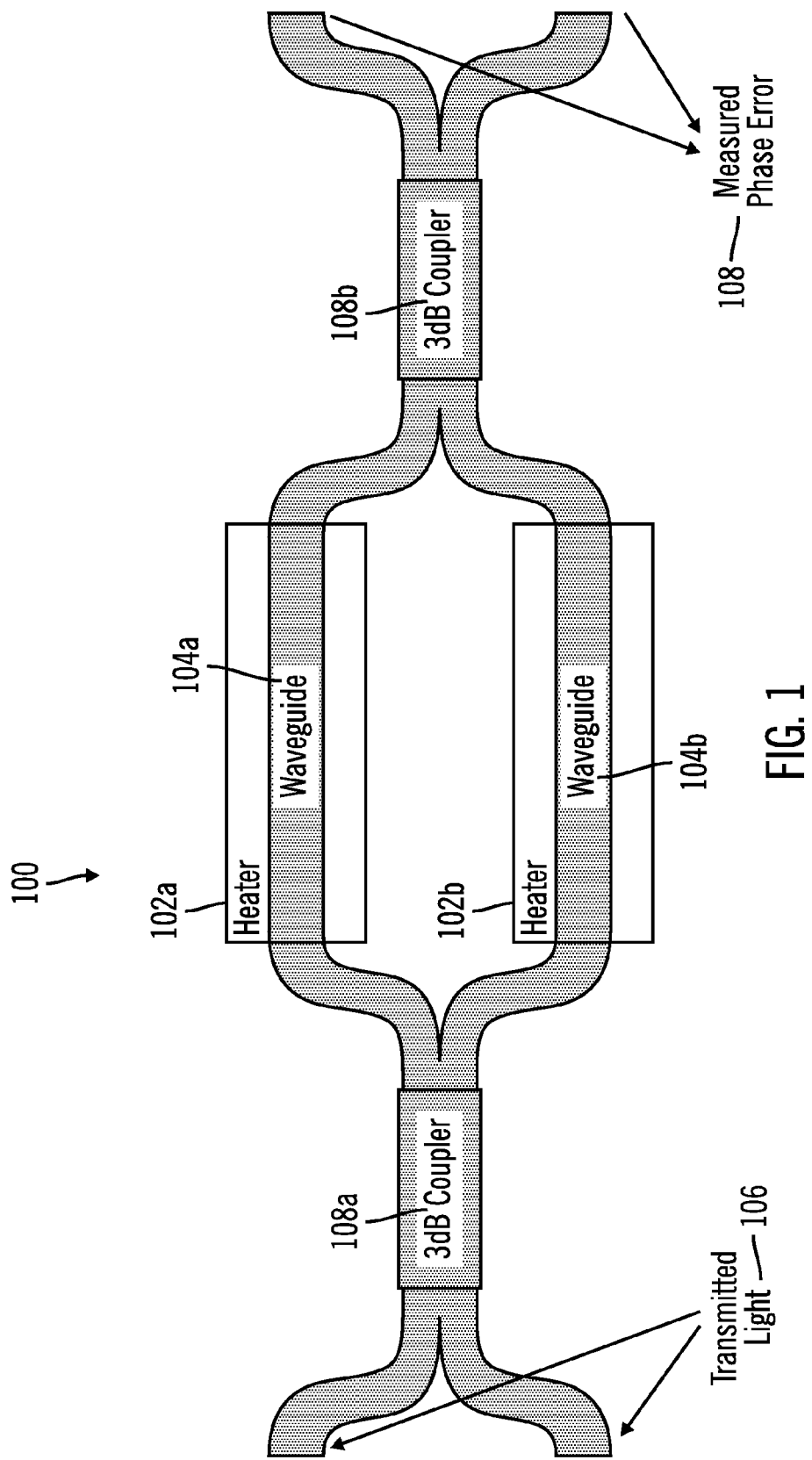
FIG. 1 illustrates a Mach-Zehnder interferometer in which certain embodiments are implemented.

FIG. 1 illustrates an optical waveguide interferometer, such as, a Mach-Zehnder interferometer 100 for computing the optical phase error of a waveguide. The Mach-Zehnder interferometer 100 has not been drawn according to scale, but has been drawn to schematically illustrate certain components.

The Mach-Zehnder interferometer 100 has metal heaters 102a, 102b that surround waveguides 104a, 104b. For example, the metal heater 102a surrounds the waveguide 104a, and the metal heater 102b surrounds the waveguide 104b. The refractive indexes for the core and the cladding of the waveguides 104a, 104b may be different. Transmitted light 106 that passes through the waveguides 104a, 104b, and the exemplary 3 dB couplers 108a, 108b of the Mach-Zehnder interferometer is used to determine the measured optical phase error 108 of the waveguides 104a, 104b. For example, transmitted light 106 first passes through the 3 dB coupler 108, then passes through the waveguides 104a, 104b, and subsequently passes through the 3 dB coupler 108b. The measured optical phase error 108 is determined after the light has passed through the 3 dB coupler 108b.

According to a first model of waveguide theory, the components of phase error from the width variation, the core refractive index variation and the cladding refractive index variation are given by (Formula 1), (Formula 2) and (Formula 3) that are provided below:

$$\frac{\partial \beta}{\partial w} = \sqrt{\frac{2}{\pi}} k^2 n_{clad}^2 \cdot \frac{\partial b}{\partial v} \Delta^{1.5} \approx A(k, n_{clad}, v) \cdot \Delta^{1.5}; \quad \text{(Formula 1)}$$

$$\frac{\partial \beta}{\partial n_{core}} = k\left(b + \frac{v}{2}\frac{\partial b}{\partial v}\right)[1 + (1-b)\Delta] \approx B_1(k, v); \quad \text{(Formula 2)}$$

$$\frac{\partial \beta}{\partial n_{clad}} = k\left(1 - b - \frac{v}{2}\frac{\partial b}{\partial v}\right)[1 - (1+b)\Delta] \approx B_0(k, v); \quad \text{(Formula 3)}$$

where, $n_{core}$ is the refractive index of the core;
$n_{clad}$ is the refractive index of the cladding;
w is the waveguide width, i.e., width of the waveguide;
d is the waveguide height, i.e., height of the waveguide;
r is the effective radius of the core, where $$r = \sqrt{\frac{w \cdot d}{\pi}};$$

v is the normalized frequency;

k is the wave vector, such that the normalized frequency, $v = k \cdot r \sqrt{n_{core}^2 - n_{clad}^2}$;

β is the wave number, i.e., the waveguide propagation constant;

Δ is the waveguide refractive index contrast between the core and the cladding;

∂β is the variation in the wave number;

∂w is the variation in the width of the waveguide;

∂n $_{core}$ is the variation in the refractive index of the core of the waveguide;

∂n $_{clad}$ is the variation in the refractive index of the cladding of the waveguide;

∂v is the variation in the normalized frequency;

(∂β/∂w) is component of phase error from the variation in the width of the waveguide (∂β/∂n $_{core}$) is the component of phase error from the variation in the refractive index of the core;

(∂β/∂n $_{clad}$) is the component of phase error from the variation in the refractive index of the cladding;

A, $B_0$, and $B_1$ are constant coefficients determined by k, v, and $n_{clad}$; and b is the normalized propagation constant.

Although b is a function of the normalized frequency, v, which is a function of waveguide refraction index contrast, Δ, the first model omits any dependence of b to the refraction index contrast, Δ. In addition to the approximations used to compute the optical phase error, the first model may also involve the production of waveguide devices with at least three refraction index contrasts. The at least three refractive index contrasts may be determined to extract the optical phase error.

Certain embodiments do not require knowing the refraction index accurately. Moreover such embodiments may use one type of waveguide with a single process flow (i.e., a single fabrication process) for extracting error. These embodiments may utilize the different dependence of the components of the phase error on the wave vector, instead of refraction index contrasts. The above components of phase error given in (Formula 1), (Formula 2) and (Formula 3) can be rewritten as:

$$\frac{\partial \beta}{\partial w} = \sqrt{\frac{2}{\pi}} k^2 n_{clad}^2 \cdot \frac{\partial b}{\partial v} \Delta^{1.5} = A(\Delta, n_{clad}, v) \cdot k^2 \quad \text{(Formula 4)}$$

$$\frac{\partial \beta}{\partial n_{core}} = k\left(b + \frac{v}{2}\frac{\partial b}{\partial v}\right)[1 + (1-b)\Delta] = B_1(\Delta, v) \cdot k \quad \text{(Formula 5)}$$

$$\frac{\partial \beta}{\partial n_{clad}} = k\left(1 - b - \frac{v}{2}\frac{\partial b}{\partial v}\right)[1 - (1+b)\Delta] = B_0(\Delta, v) \cdot k \quad \text{(Formula 6)}$$

Certain embodiments may vary k during measurements while keeping the normalized frequency, v, as a constant. As a result, certain embodiments can extract all coefficients A, $B_0$, and $B_1$. This can be achieved by designing a series of waveguides with different widths. According to waveguide theory, the normalized frequency, v, and the waveguide width w has the relationship given by (Formula 7)

$$v = \frac{2\pi}{\lambda} \cdot \sqrt{\frac{w \cdot d}{\pi}} \sqrt{n_{core}^2 - n_{clad}^2} \quad \text{(Formula 7)}$$

where,

λ is the wavelength; and d is the height of the waveguide.

Based on the above (Formula 7), certain in embodiments may select a series of wavelengths, λ, to keep the normalized frequency, v, constant over the range of widths (and heights) of the waveguide. In certain embodiments, even the waveguide dispersion may be included analytically.

Figure 2:
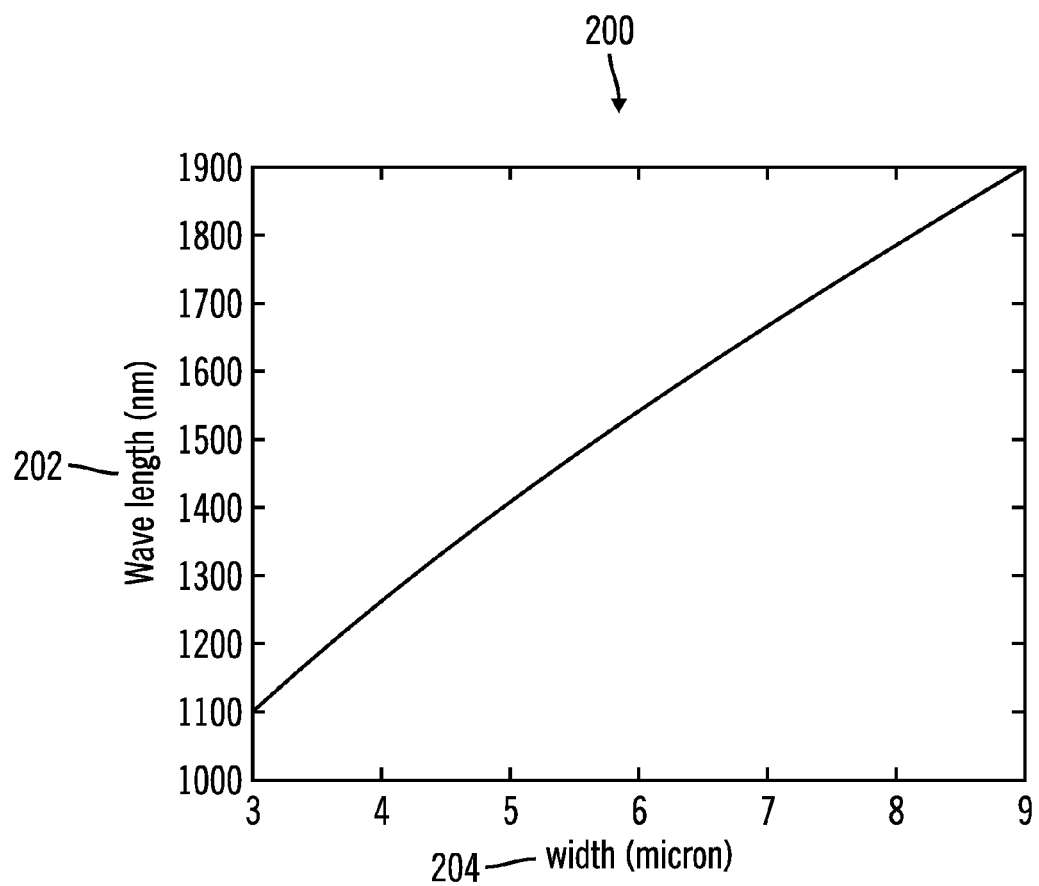
FIG. 2 illustrates a graph that displays the wavelength of an optical beam with respect to the width of a waveguide in the Mach-Zehnder interferometer, in accordance with certain embodiments.

FIG. 2 illustrates a graph 200 that displays the measurement wavelength, λ, (reference numeral 202) with respect to the width, w, (reference numeral 204) in the Mach-Zehnder interferometer 100. The wavelengths, λ, and waveguide widths, w, which keep the normalized frequency, v, a constant, are plotted in FIG. 2. The graph 200 has been drawn on the basis of (Formula 7).

Figure 3:
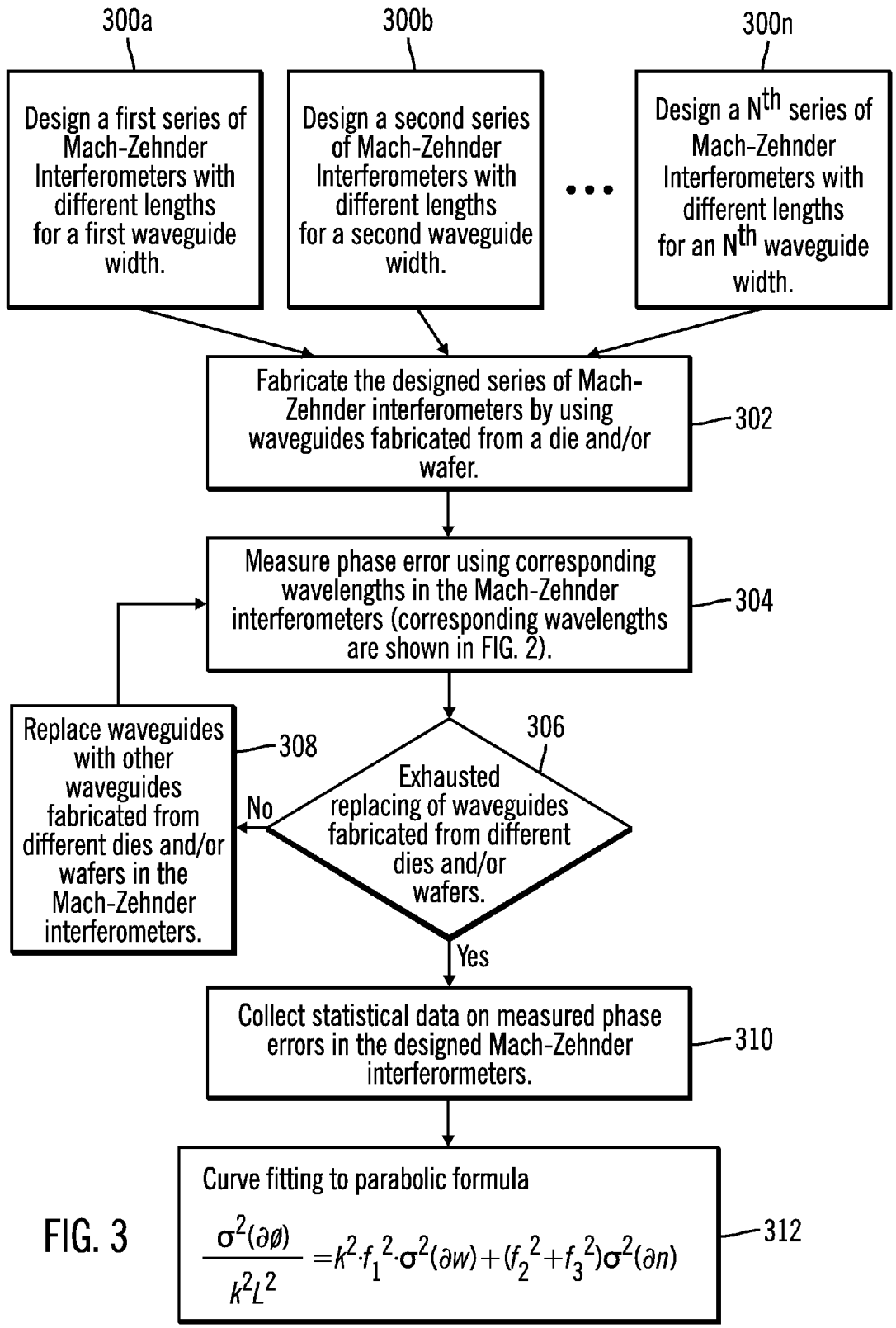
FIG. 3 illustrates first operations for computing phase error, in accordance with certain embodiments.

FIG. 3 illustrates operations for computing phase error, in accordance with certain embodiments implemented in Mach-Zehnder interferometers and computational devices that process data.

Control starts at blocks 300a, 300b . . . 300n, where a series of Mach-Zehnder interferometers with different lengths are designed for a plurality of waveguide widths. For example, in block 300a a series of Mach-Zehnder interferometers with different lengths are designed for a first waveguide width, in block 300b a series of Mach-Zehnder interferometers with different lengths are designed for a second waveguide width. Based on the design the corresponding series of Mach-Zehnder interferometers are fabricated.

From blocks 300a . . . 300n, control proceeds to block 302, where the Mach-Zehnder interferometers designed in blocks 300a . . . 300n are fabricated by using waveguides fabricated from a die and/or wafer. Phase errors of waveguides in the fabricated Mach-Zehnder interferometers are estimated (at block 304) by transmitting corresponding wavelengths of light though the fabricated Mark-Zehnder interferometers. The corresponding wavelengths to be transmitted may be determined from FIG. 2, where the wavelengths corresponding to different waveguide widths are shown. For example, if a waveguide has a particular width, then the wavelength corresponding to the particular width is determined from FIG. 2. Optical beams of the determined wavelength are transmitted through the Mach-Zehnder interferometers that include waveguides of the particular width.

Control proceeds to block 306, where it is determined whether an adequate number of waveguides of the same width constructed from different dies and/or wafers have been used to fabricate the designed first, second, . . . $N^{th}$ series of Mach-Zehnder interferometers. If not, waveguides in the first, second, . . . $N^{th}$ series of Mach-Zehnder interferometers are replaced (at block 308) with other waveguides fabricated from different dies and/or wafers. The replacement of the waveguides may involve a refabrication of the first, second, and $N^{th}$ series of Mach-Zehnder interferometers. After the replacement of the waveguides at block 308, control returns to block 304.

If at block 306, it is determined that an adequate number of waveguides of the same width constructed from different dies and/or wafers have been used to fabricate the designed first, second, . . . $N^{th}$ series of Mach-Zehnder interferometers, then control proceeds to block 310, where statistical data, such as standard deviation, etc., are gathered on the measured phase errors by using different waveguides fabricated from different dies and wafers.

A curve fitting (at block 312) to the parabolic formula shown in (Formula 8) estimates the phase error, ∂ø, of a waveguide from the statistical data.

$$\frac{\sigma^2(\partial\phi)}{k^2L^2} = k^2 \cdot f_1^2 \cdot \sigma^2(\partial w) + (f_2^2 + f_3^2)\sigma^2(\partial n) \quad \text{(Formula 8)}$$

where,

σ is standard deviation and; and

Figure 4:
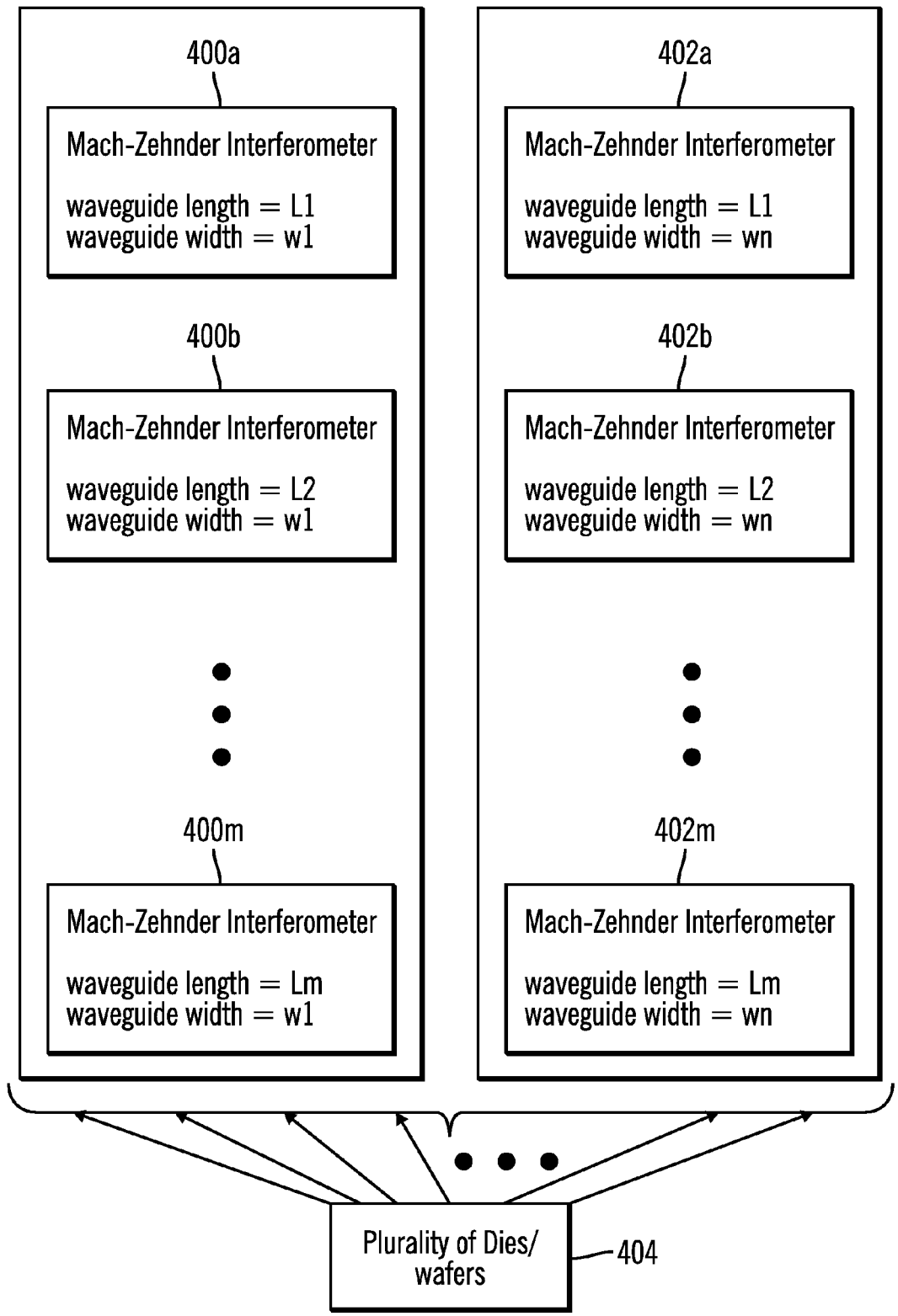
FIG. 4 illustrates a plurality of Mach-Zehnder interferometers constructed in accordance with certain embodiments.

∂n is the error in the refractive indexes of the core and the cladding of a waveguide;

L is the length of a waveguide, and where $f_1$, $f_2$, $f_3$ correspond to A, $B_0$, and $B_1$ respectively;

FIG. 4 illustrates a plurality of Mach-Zehnder interferometers constructed in accordance with certain embodiments for determining optical phase errors in waveguides.

A plurality of Mach-Zehnder interferometers 400a, 400b, . . . 400m are fabricated with the same waveguide width, w1, but different waveguide lengths L1, L2, . . . Lm. Similarly a plurality of other Mach-Zehnder interferometers of a different waveguide width than w1 are constructed. For example, the plurality of Mach-Zehnder interferometers 402a, 402b, 402m are fabricated with the same waveguide width, wn, but different waveguide lengths L1, L2, . . . Lm. All the Mach-Zehnder interferometers 400a . . . 400m, . . . , 402a . . . 402m are again refabricated from different dies or wafers 404 and the optical phase errors of waveguides are measured in the Mach-Zehnder interferometers. A statistical determination is made to determine the optical phase error of waveguides as described earlier in FIG. 3.

Figure 5:
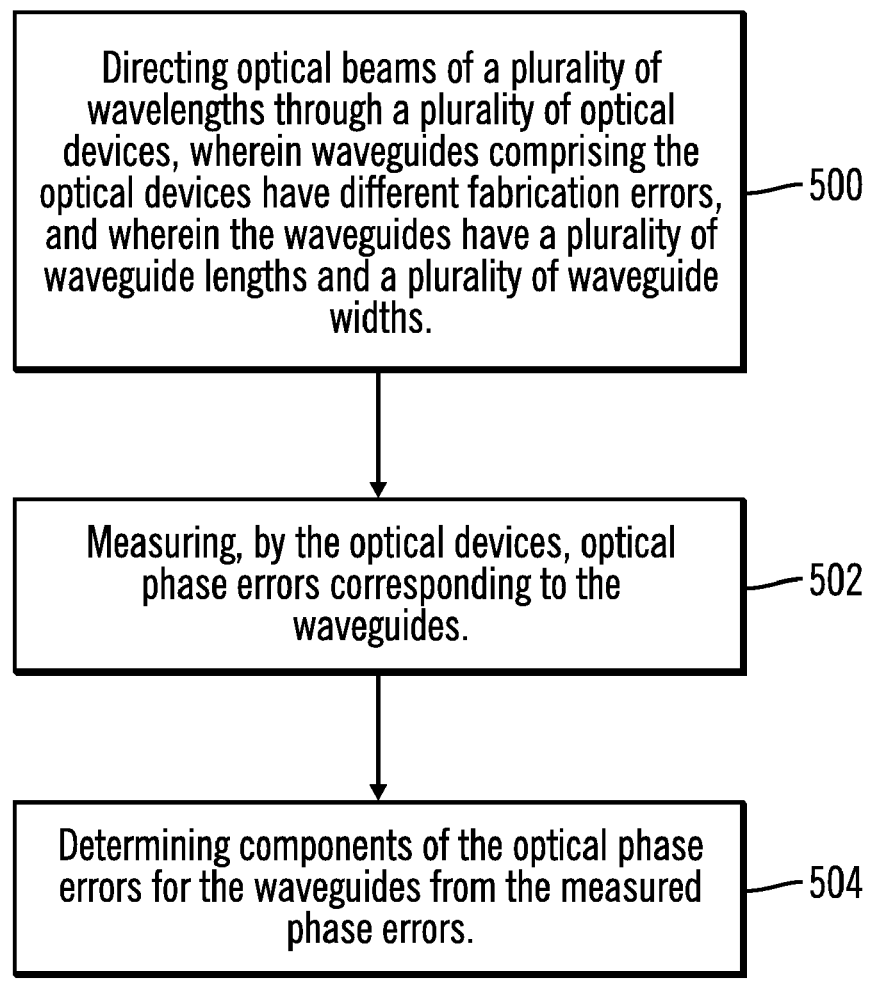
FIG. 5 illustrates second operations for computing phase error, in accordance with certain embodiments.

FIG. 5 illustrates operations for computing phase error, in accordance with certain embodiments.

Control starts at block 500, where optical beams of a plurality of wavelengths are directed through a plurality of optical devices, wherein waveguides comprising the optical devices have different fabrication errors, and wherein the optical devices have a plurality of waveguide lengths and a plurality of waveguide widths. For example, in certain embodiments, the plurality of optical devices are interferometers, such as, the Mark-Zehnder interferometers, 400a . . . 400m, and 402a . . . 402m. In certain alterative embodiments, the plurality of optical devices may include arrayed waveguide gratings.

Optical phase errors corresponding to the waveguides are measured (at block 502) by the optical devices. The components of the optical phase errors for the waveguides are determined (at block 502) from the measured phase errors.

The determined components of the optical phase errors may be used to improve the design and the fabrication process of optical devices.

Figure 6:
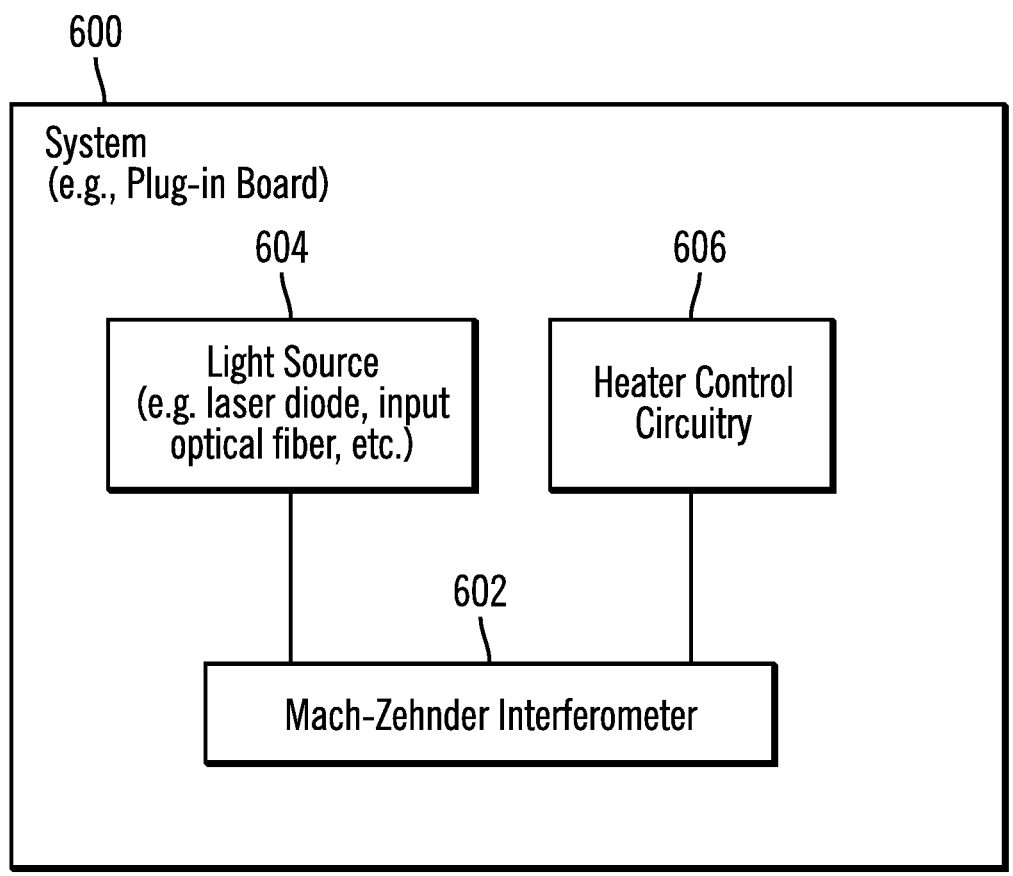
FIG. 6 illustrates a system, in which certain embodiments are implemented.

FIG. 6 illustrates a system 600, in which certain embodiments are implemented. The system may include a Mach-Zehnder interferometer 602 coupled to a light source 604 and a heater control circuitry 606. In certain embodiments, the system 600 may comprise a plug-in board, and the Mach-Zehnder interferometer 602 may comprise the Mach-Zehnder interferometer 100 of FIG. 1.

In certain embodiments, the light source 604 may comprise a laser diode mounted on a chip resulting in a hybrid integration. The laser diode may be referred to as a laser diode light source. In certain alternative embodiments, the light source 604 may be from an input optical fiber that is coupled to the chip through a polished edge. Additionally, in certain embodiments the heater control circuitry 606 may control the heater(s) of the Mach-Zehnder interferometer 602. For example, if the Mach-Zehnder interferometer 602 comprises the Mach-Zehnder interferometer 100 then the heater control circuitry controls the heaters 102a, 102b. In certain embodiments, the controlling electronics for the heater(s) can be either on the chip or may be coupled from an off-chip controller.

While it is mathematically possible to estimate optical phase error in waveguides by using Mach-Zehnder interferometers constructed from waveguides with three different known refraction indexes, in actual practice it may be difficult to know the exact value of the refraction index of a waveguide and to support waveguides with three refraction index contrasts. Moreover, certain approximate mathematical models may be valid for a limited range of refractive index contrasts, such as, very low refraction index contrasts.

Certain embodiments may involve a priori knowledge of a single refraction index and do not require knowing the exact value of the refractive index. Moreover, the dependence of optical phase error on the wavelength is determined without using approximations.

Certain embodiments provide a system and associated methods for extracting random optical phase error in a waveguide. By designing a series of Mach-Zehnder interferometers with different waveguide widths, and by measuring optical phase errors in the Mach-Zehnder interferometers via the transmission of optical beams of corresponding wavelengths, the components of random phase error can be extracted for a waveguide. Certain embodiments improve the accuracy of phase error determination and may be simpler to implement when compared to techniques that involve waveguides with three different refraction indices in Mach-Zehnder interferometers. Certain embodiments also allow the extraction of the optical phase error more accurately by using a waveguide with only one refraction index. The phase error extraction may be one design parameter for an arrayed waveguide grating.

Certain embodiments use different waveguides in a series of Mach-Zehnder interferometers to extract the phase error components associated with critical dimension, core and cladding refractive index variations. By extracting the phase error from each Mach-Zehnder interferometer via the use of a laser and/or optical source at a specific wavelength, the random optical phase error can be extracted from the difference dependence of the random optical phase error on the wave number.

At least certain of the operations of FIGS. 3 and 5 can be performed in parallel as well as sequentially. In alternative embodiments, certain of the operations may be performed in a different order, modified or removed.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   directing optical beams of a plurality of wavelengths through a plurality of optical devices, wherein waveguides comprising the optical devices have different fabrication errors, and wherein the waveguides have a plurality of waveguide lengths and a plurality of waveguide widths;
   measuring, by the optical devices, optical phase errors corresponding to the waveguides; and
   determining components of the optical phase errors for the waveguides from the measured phase errors.

2. The method of claim 1, wherein the plurality of optical devices are optical waveguide interferometers.

3. The method of claim 2, wherein the optical waveguide interferometers are Mark-Zehnder interferometers.

4. The method of claim 1, wherein the plurality of optical devices are arrayed waveguide gratings.

5. The method of claim 1, wherein refractive indexes associated with cores and claddings of the waveguides are not required to be known for the determining of the components of the optical phase errors.

6. The method of claim 1, wherein a single process flow is used for the determining of the components of the optical phase errors.

7. The method of claim 1, wherein the waveguides have a single refractive index contrast.

8. The method of claim 1, wherein the measuring further comprises: varying a wave vector while maintaining a fixed normalized frequency.

9. The method of claim 1, wherein the optical devices are optical waveguide interferometers, the method further comprising:
fabricating the optical waveguide interferometers, wherein the waveguides included in the optical waveguide interferometers are fabricated from a wafer;
measuring first optical phase errors using corresponding wavelengths of the optical beams directed through the optical waveguide interferometers, wherein the corresponding wavelengths are determined based on the waveguide widths;
replacing the waveguides with other waveguides fabricated from different wafers; and
measuring additional optical phase errors via the other waveguides.

10. The method of claim 1, wherein the determining of the components of the optical phase errors for the waveguides further comprise:
collecting statistical data on the measured optical phase errors; and
estimating the components of the optical phase errors from the collected statistical data.

11. The method of claim 1, wherein the plurality of wavelengths are selected to keep a normalized frequency constant over a range of spatial core sizes of the waveguides.

12. A system, comprising:
a plurality of optical devices, wherein optical beams of a plurality of wavelengths are directed through the plurality of optical devices; and
waveguides included in the plurality of optical devices, wherein the waveguides have different fabrication errors, wherein the waveguides have a plurality of waveguide lengths and a plurality of waveguide widths, wherein the optical devices output information used to measure the optical phase errors corresponding to the waveguides, and wherein the optical devices output information used to determine components of the optical phase errors for the waveguides.

13. The system of claim 12, wherein the plurality of optical devices are optical. wave guide interferometers.

14. The system of claim 13, wherein the optical waveguide interferometers are Mark-Zehnder interferometers.

15. The system of claim 12, wherein the optical devices output information used for the determining of the components of the optical phase errors without using refractive indices associated with cores and claddings of the waveguides.

16. The system of claim 12, wherein the optical devices output information used for determining of the components of the optical phase errors by using a single process flow, wherein the single process flow is a single fabrication process.

17. The system of claim 12, wherein the waveguides have a single refractive index contrast.

18. The system of claim 12, wherein the optical devices are enabled to allow a wave vector to be varied while maintaining a fixed normalized frequency, and wherein the optical devices while enabled to allow the wave vector to be varied while maintaining the fixed normalized frequency output information used to determine the optical phase errors corresponding to the waveguides.

19. The system of claim 12, wherein the optical devices are optical waveguide interferometers, wherein the waveguides included in the optical waveguide interferometers are fabricated from a wafer, wherein the optical waveguide interferometers output information used to measure first optical phase errors using corresponding wavelengths of the optical beams directed through the optical waveguide interferometers, wherein the optical waveguide interferometers output information used to determine the corresponding wavelengths on the waveguide widths, the system further comprising other waveguides fabricated from different wafers, wherein the other waveguides output information used to measure additional optical phase errors.

20. The system of claim 12, wherein the optical devices output information used to determine the components of the optical phase errors for the waveguides by collecting statistical data on the measured optical phase errors and estimating the components of the optical phase errors from the collected statistical data.

21. The system of claim 12, wherein the plurality of wavelengths are selected to keep a normalized frequency constant over a range of spatial core sizes of the waveguides.

22. A system, comprising:
a laser diode light source;
a plurality of optical devices, wherein optical beams of a plurality of wavelengths from the laser diode light source are directed through the plurality of optical devices; and
waveguides included in the plurality of optical devices, wherein the waveguides have different fabrication errors, wherein the waveguides have a plurality of waveguide lengths and a plurality of waveguide widths, wherein the optical phase errors corresponding to the waveguides are measured by the optical devices, and wherein components of the optical phase errors for the waveguides are determined from the measured phase errors.

23. The system of claim 22, wherein the plurality of optical devices are Mark-Zehnder interferometers, the system further comprising:
at least one heater included in the Mark-Zehnder interferometers; and
a heater control circuitry that controls the at least one heater.

24. The system of claim 22, wherein the optical devices output information used for the determining of the components of the optical phase errors without using refractive indices associated with cores and claddings of the waveguides.

25. The system of claim 22, wherein the optical devices output information used for determining of the components of the optical phase errors by using a single process flow, wherein the single process flow is a single fabrication process.

26. The system of claim 22, wherein the waveguides have a single refractive index contrast.

27. The system of claim 22, wherein the optical devices are enabled to allow a wave vector to be varied while maintaining a fixed normalized frequency, and wherein the optical devices while enabled to allow the wave vector to be varied while maintaining the fixed normalized frequency output information used to determine the optical phase errors corresponding to the waveguides.

28. The system of claim 22, wherein the optical devices are optical waveguide interferometers, wherein the waveguides included in the optical waveguide interferometers are fabricated from a wafer, wherein the optical waveguide interferometers output information used to measure first optical phase errors using corresponding wavelengths of the optical beams directed through the optical waveguide interferometers, wherein the optical waveguide interferometers output information used to determine the corresponding wavelengths based on the waveguide widths, the system further comprising other waveguides fabricated from different wafers, wherein the other waveguides output information used to measure additional optical phase errors.

29. The system of claim 22, wherein the optical devices output information used to determine the components of the optical phase errors for the waveguides by collecting statistical data on the measured optical phase errors and estimating the components of the optical phase errors from the collected statistical data.

* * * * *

UNITED STATES PATENT AND TRADEMARK OFFICE
CERTIFICATE OF CORRECTION

| | |
|---|---|
| PATENT NO. | : 7,215,841 B2 |
| APPLICATION NO. | : 11/019718 |
| DATED | : May 8, 2007 |
| INVENTOR(S) | : Everett X. Wang et al. |

It is certified that error appears in the above-identified patent and that said Letters Patent is hereby corrected as shown below:

Column 7, Line 56, replace "optical. wave guide" with --optical waveguide--.

Column 8, Line 22, insert the word --based-- after "wavelengths".

Signed and Sealed this

Tenth Day of November, 2009

David J. Kappos
*Director of the United States Patent and Trademark Office*